Sept. 9, 1958  R. H. SULLIVAN  2,851,649
PARKING CONTROL FOR WINDSHIELD WIPERS
Filed March 25, 1954

INVENTOR.
Raymond H. Sullivan
BY
George H. Strickland
His Attorney

United States Patent Office 2,851,649
Patented Sept. 9, 1958

2,851,649

PARKING CONTROL FOR WINDSHIELD WIPERS

Raymond H. Sullivan, Rochester, N. Y., assignor to General Motors Corporation, Detroit, Mich., a corporation of Delaware Application March 25, 1954, Serial No. 418,503

2 Claims. (Cl. 318—275)

This invention pertains to electrically operated windshield wipers, and particularly to means for parking windshield wipers in a predetermined position.

Heretofore, electrically operated windshield wipers have been parked in numerous ways, such as by mechanically braking the electric motor; declutching the electric motor and the wiper blades at a predetermined position thereof; deenergizing the motor and utilizing coasting motor inertia to park wiper blades; and by dynamically braking the motor so as to park the wiper blades in a predetermined position. This invention relates to the latter type of parking system, and more specifically to a self-generative dynamic braking circuit arrangement. Accordingly, among my objects are the provision of means for automatically parking an electrically operated windshield wiper by actuation of a single manual switch; the further provision of simplified means for dynamically braking an electric motor; and the still further provision of a parking and motor circuit arrangement whereby the necessity of field winding energization during the period of dynamic braking is eliminated.

The aforementioned and other objects are accomplished in the present invention by utilizing stored energy in the magnetic circuit to dynamically brake, or stall, the short-circuited armature of a deenergized electric motor. Specifically, the electric motor disclosed herein is of the cumulative compound wound, direct current type. However, the dynamic braking circuit of this invention could also be used in conjunction with a shunt wound, direct current motor, and the use of a compound wound motor is only exemplary. The motor is dynamically braked by deenergizing the motor and simultaneously therewith short-circuiting the armature and shunt field, whereby the motor acts as a self-excited generator due to the decay of flux in the short circuited shunt field.

When the self-generative dynamic braking circuit of this invention is used in conjunction with a compound wound motor, the series field winding must be connected with the armature so that the short circuit for the armature does not include the series field winding. This arrangement is necessary since if the series field winding is connected in the armature short circuit, the flow of current therethrough establishes a magnetic field, which opposes the stored energy of the shunt field winding, and, hence, reduces the dynamic braking action to a point where it is insufficient to instantaneously stall the armature.

In the disclosed embodiment, the motor energizing circuit includes a manually operable switch having parking, low speed, and high speed positions. The energizing circuit also includes an automatically operable parking switch, of the single pole, double throw snap action type, which is actuated by a motor operated element. More particularly, the element is actuated by a motion converting mechanism driven by the motor for converting rotation of the motor into oscillation of a wiper driving member. Furthermore, the parking switch actuating element, in the preferred embodiment, is not driven in unison with the wiper, but is only driven when the motion converting mechanism is adjusted to increase the amplitude of oscillation imparted to the wiper driving member in accordance with the disclosure of copending application, Serial No. 394,771, filed November 27, 1953, in the name of Walter D. Harrison. Thus, when the manual switch is moved to the parking position, motor energization is controlled by the parking switch, and when the wiper blades arrive at their predetermined parked position, the switch actuating element is operated to simultaneously deenergize the motor and short-circuit the armature. In this manner, the motor is dynamically braked to a stop almost instantaneously and the wiper blades remain in the parked position. However, it is to be understood that the control circuit of this invention is capable of use with a wiper arrangement wherein the parking switch is operated by a member driven in unison with the motor so as to be operated during each cycle of wiper operation.

Further objects and advantages of the present invention will be apparent from the following description, reference being had to the accompanying drawing wherein a preferred embodiment of the present invention is clearly shown.

Figure 1:
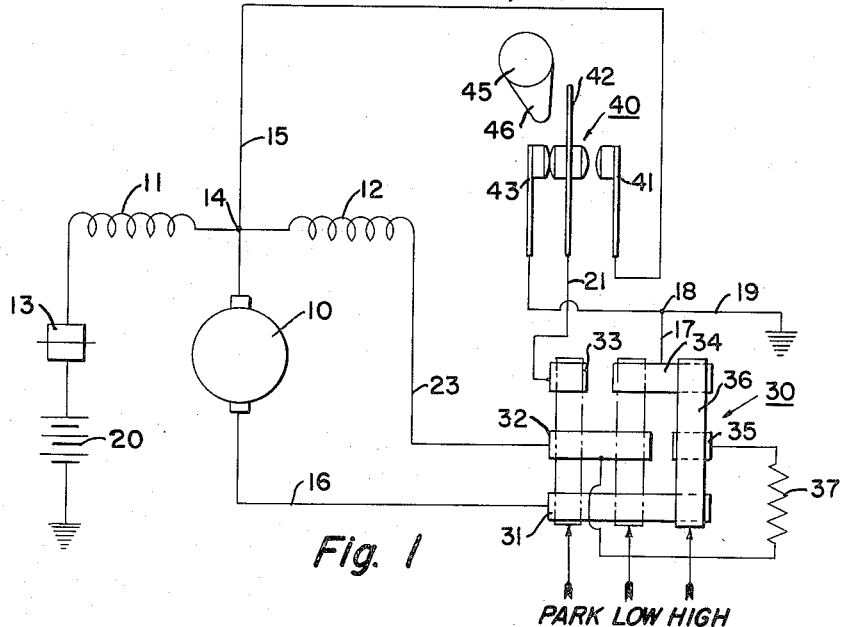
Fig. 1 is a schematic electrical diagram illustrating the circuit connections when the windshield wiper motor is operated at a high speed.

With reference to the drawing, a windshield wiper motor is shown including an armature 10, a series field winding 11, a shunt field winding 12, and a thermal overload circuit breaker 13, which may be of conventional design. However, whereas it has heretofore been customary to connect the series field winding 11 so that it is always connected in circuit with the windings of the armature 10, in the present instance, the series field winding 11 is effectively isolated from the armature circuit which may be short-circuited, for a reason which will appear more fully hereinafter. The electrical circuit includes a battery 20, one terminal of which is connected to ground and the other terminal of which is connected through the thermal overload circuit breaker 13 to one end of the series field winding 11. The other end of the series field winding 11 is connected with a conductor 15. The conductor 15 is connected to one side of the armature 10 at one end, and is connected with a stationary contact 41 of a parking switch 40 at the other end. The other side of the armature 10 is connected by a conductor 16 with a stationary switch contact 31 of a manually operable switch designated generally by the numeral 30.

Figure 2:
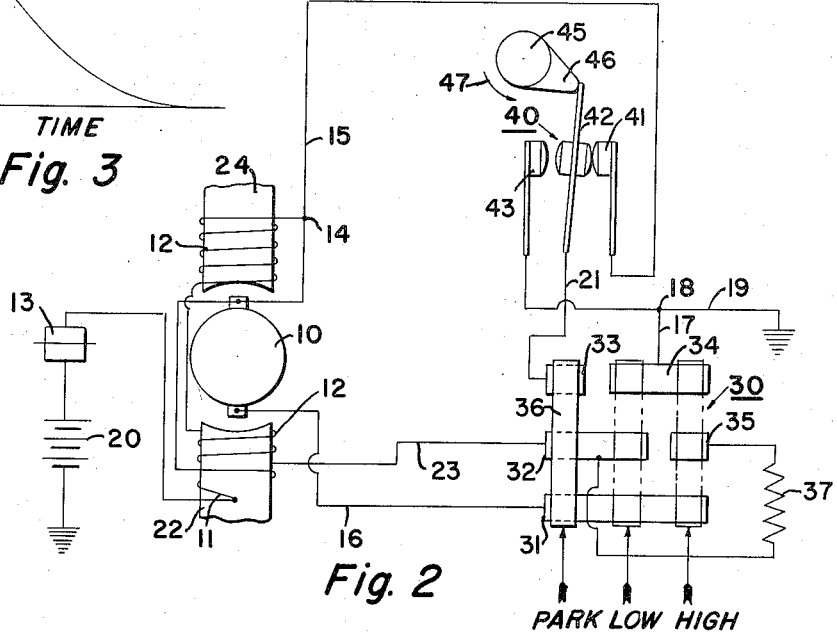
Fig. 2 is a diagram similar to Fig. 1 illustrating the circuit connections for parking the wiper blades, and illustrating the motor with greater detail.

One end of the shunt field winding 12 is connected at point 14 to the conductor 15, the other end of the shunt field winding being connected to a second stationary contact 32 of switch 30, by conductor 23. Moreover, as shown in Fig. 2, the series winding 11 is associated with pole piece 22, while the shunt winding 12 is associated with pole pieces 24 and 22. The manually operable switch 30 also includes stationary contacts 33, 34 and 35, as well as a movable contact bridging member 36. The stationary contact 34 is connected to a conductor 17, which is connected at point 18 with a conductor 19, which is connected to ground. Stationary contacts 35 and 32 are interconnected by a speed controlling resistor 37.

The automatically operable parking switch 40 is of the single pole, double throw snap action type and includes a movable contact member 42, as well as stationary contacts 41 and 43. The stationary contact 43 is connected to ground conductor 19, while the movable contact member 42 is connected by a conductor 21 to stationary contact 33 of the switch 30. The automatically operable parking switch 40 is associated with a motor driven element 45, which includes an arm portion 46 adapted to engage movable contact 42 so as to simultaneously disengage contacts 42 and 43 and effect engagement between contacts 41 and 42, when the wiper blades, not shown, reach the parked position.

As alluded to hereinbefore, the parking control arrangement of this invention is particularly adapted for use in conjunction with electric motor driven windshield wiper actuating mechanism of the type disclosed in the aforementioned copending application, Serial No. 394,771. Thus, the element 45 is rotated in a counter-clockwise direction, as indicated by arrow 47 in Fig. 2, only when the wiper blades arrive at their parked position beyond their normal wiping stroke. However, it is readily apparent that the element 45 could be driven in unison with the windshield wiper motor so as to cyclically operate the movable switch contact 42 without departing from the scope of this invention, similar to the arrangement shown in the Bohl Patent 2,651,013.

When the bridging member 36 of the switch 30 is in the full line high speed position of Fig. 1, a circuit is completed from ground conductor 19 through conductor 17, contact 34, bridging member 36, contact 31, conductor 16, armature 10, conductor 15, series field winding 11 to the battery 20 through the closed contacts of the overload circuit breaker 13. Thus, the armature windings and the series field winding 11 are energized. The shunt field winding 12 is energized from the battery 20 through the series field winding 11, conductor 23, the contact 32 through the resistor 37, contact 35, bridging member 36, contact 34, and conductors 17 and 19. Inasmuch as the resistor 37 reduces the current flow through the shunt field winding 12, the motor will be operated at high speed, as is well known in the art.

When the bridging member 36 is moved to the intermediate low speed position, as indicated by dotted lines in Fig. 1, the series field winding 11 and the armature 10 will be energized in the same manner, as heretofore described, whereas the shunt field winding 12 will be connected directly to ground, thereby shunting the resistor 37. In this manner, the energization of shunt field winding 12 is increased so as to reduce motor speed.

When it is desired to discontinue operation of the windshield wiper, the bridging member 36 is moved to the dotted line, parked position of Fig. 1, as shown in full lines in Fig. 2. The motor will continue to be energized in the following manner, as long as the element 45 is in the position of Fig. 1. Thus, the circuit for the series field winding 11 and the armature 10 is from the battery to conductor 16, switch contact 31, bridging member 36, contact 33, conductor 21, though closed switch contacts 42 and 43 of the parking switch 40 to ground. Similarly, the shunt field winding 12 is energized through the series field winding 11, conductor 23, switch contact 32, bridging member 36, contact 33, conductor 21 and the closed contacts 42 and 43 of the parking switch 40. However, as soon as the wiper blades, not shown, arrive at the pedetermined parked position, the element 45 will rotate in the direction of arrow 47 to position the arm 46, as shown in Fig. 2. Movement of the arm 46 will initially separate contacts 42 and 43, thereby completely deenergizing the motor. However, substantially simultaneously therewith, by reason of the snap action of switch contact 42, contacts 41 and 42 will be engaged, thereby short-circuiting the armature 10 and the shunt field winding 12 through conductor 15, conductor 16, stationary switch contact 31, bridging member 36, stationary contact 33, conductor 21, and closed contacts 41 and 42. It is to be understood that any suitable switch which is capable of effecting substantially simultaneous disengagement of contacts 42 and 43, and engagement of contacts 41 and 42 can be used. Moreover, it should be noted that the series field winding 11 is not included in the short-circuit connection of the armature 10 since it is open circuited. As soon as the armature 10 and shunt field 12 are short-circuited, the motor will act as a self-excited generator due to the stored flux of the shunt field 12, which is sufficient to dynamically brake the armature almost instantaneously. In this manner, the armature is stalled and the wiper blades remain in the parked position.

The series field winding 11 is not included in the short-circuited connection of the armature 10 during dynamic braking since it was found that if the series winding were included in the armature short-circuit, the flow of current therethrough established a magnetic field, which opposed the residual motor flux and substantially reduced the dynamic braking action. However, in the motor circuit arrangement depicted in Figs. 1 and 2, since the short-circuited armature current does not flow through the series field winding, the stored flux of the shunt field 12 is sufficient to effectively stall the armature 10 almost instantaneously upon engagement of contacts 41 and 42.

Heretofore, it has been believed that without energization of a field winding, the dynamic braking effect would be inoperative. However, inasmuch as the shunt field flux does not instantly drop to zero upon denergization of the field winding, it has been found that an electric motor can be effectively dynamically braked without energization of the field windings. Moreover, the self-generative dynamic braking circuit of this invention is such that the braking effort increases with an increase in armature speed, and in this manner automatically compensates for the additional coasting energy stored in the armature at higher speeds.

In order to obtain effective braking with variation in armature speeds at the time of stalling, the ratio of energy stored in the armature at the time of stalling to the stalling effort of the braking system should be substantially constant. That is, where $W_a$=the kinetic stored in the armature at the time of stalling or stopping, and $W_g$=the power in the braking system at the time of braking, the ratio of $W_a$ to $W_g$, or, $a$, should be constant, that is, $$a = \frac{W_a}{W_g} = \text{constant} \qquad (1)$$

When contacts 42 and 43 of the parking switch 40 are in engagement with the bridging member 36 of the switch 30 in the parked position of Fig. 2, the motor armature will revolve at a speed dependent upon battery voltage, motor temperature and load. When contacts 42 and 43 are separated, the battery 20 is disconnected from the motor, and without braking, the armature will decelerate until all of the stored energy thereof is dissipated. However, if contacts 41 and 42 are closed substantially simultaneously, or at least instantaneously after, the separation of contacts 42 and 43, the armature will still be revolving at full speed and the shunt field current will be at its maximum value. Under these conditions with the armature short-circuited, the motor will act as a self-excited generator with a short-circuited armature, which results in a stopping load, or dynamic breaking effect on the armature. Thus, let $I$=moment of inertia of the motor armature,
$V$=the velocity of the armature,
$W_a$=the energy stored in the motor armature,
$V=K_v$ R. P. M. ($K_v$=a constant), then $$W_a = \tfrac{1}{2} IV^2 = \tfrac{1}{2} I (K_v \text{ R. P. M.})^2 \qquad (2)$$

Thus, the effort required to stall the armature will vary as the square of the armature speed at the time of stopping. Now let $W_g$=the power generated by the armature,
$E$=the battery voltage,
$R$=the armature resistance,
$I_a$=the short-circuited armature current, then $$I_a = \frac{E}{R} \quad (3)$$

and $$W_g = EI_a = \frac{E^2}{R} \quad (4)$$

This indicates that braking effort will vary as the square of the battery voltage, which will afford voltage compensation.

$$E \text{ also} = K_g = \text{R. P. M.} \quad (5)$$

wherein $K_g$=a constant and R. P. M.=armature speed.

Now substituting (4) in (3) can be seen that $$W_g = \frac{(K_g \text{ R. P. M.})^2}{R} \quad (6)$$

This indicates that the braking effort will vary as the square of the speed, which will afford speed compensation. Now from Equations 1, 2 and 5, the ratio $$a = \frac{W_a}{W_g} = \frac{\frac{1}{2}I(K_v \text{ R. P. M.})^2}{\frac{(K_g \text{ R. P. M.})^2}{R}} = \frac{IK_v^2 R}{2K_g^2} \quad (7)$$

This indicates that ($a$) is a constant independent of speed and fulfils the requirements of a constant ratio of stored armature to generated stopping effort in the armature. Moreover, since the effect of an increase in motor temperature is to cause an increase in shunt field resistance and speed, and since speed cancels out of Equation 6, the braking system also affords compensation for temperature changes.

Figure 3:
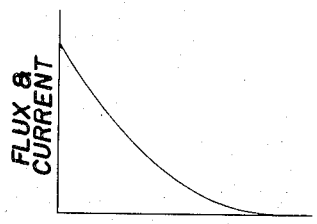
Fig. 3 represents a graph depicting the exponential decay of flux and current in the shunt field upon short circuiting thereof.

Moreover, although the shunt field is short-circuited at the same time as the armature is short-circuited, the shunt field flux will not instantaneously drop to zero, since the current and flux in the shunt field will reduce gradually, the rate of decay depending upon the time constant of the circuit. The shunt field stored energy may be expressed as follows:

$$W = \frac{1}{2} Li^2$$

wherein:

$W$=stored energy at time of short-circuiting
$L$=inductance of the winding
$i$=field current at the instant before short-circuiting Now, with reference to Fig. 3, wheerin the abscissa indicates time in seconds, and the ordinate indicates current and flux, it may be seen that the flux decay upon short-circuiting of the shunt field winding is exponential. Thus, the shunt field current and flux decays over a period of time sufficient to facilitate dynamic, or self-generative, braking of the short-circuited armature, which is brought to a stand-still almost instantaneously.

To initiate wiper operation after the blades have been parked, it is only necessary to move the bridging member 36 to either the low or the high speed positions and in so doing, stationary switch contacts 31 and 33 are disconnected so as to interrupt the short-circuiting connection of the armature and shunt field through closed contacts 41 and 42. Moreover, from the aforegoing, it is apparent that the element 45 could be driven in unison with the motor 10 since cyclical operation of the switch 40 when the bridging member 36 is in either of its running positions, will have no effect upon the motor.

From the foregoing, it is manifest that the present invention provides a simplified parking control arrangement for electrically operated windshield wipers. Moreover, the use of residual motor flux to obtain dynamic braking action by merely short-circuiting the armature eliminates the requirement of an additional set of switch contacts and a circuit for energizing the field windings to effect dynamic braking, as has heretofore been necessary in prior art arrangements.

While the embodiment of the present invention as herein disclosed, constitutes a preferred form, it is to be understood that other forms might be adopted.

What is claimed is as follows:

1. A windshield wiper control circuit, including, a source of current, a motor having an armature and a shunt field winding, a first circuit connecting said armature and field winding with said source of current, an automatically operable switch, a second circuit including said armature, said field winding, and said automatically operable switch, and manually operable switch means in said first and second circuits, said automatically operable switch being connected in parallel circuit relationship with said manually operable switch, said manually operable switch being movable from a first position for connecting said armature and field winding to said source of current to a second position wherein said automatically operable switch controls energization of said armature and field winding for simultaneously deenergizing the armature and field winding and short circuiting said armature and field winding to establish a dynamic braking circuit for said motor at a predetermined motor position.

2. A control for a windshield wiper operable by an electric motor having an armature, a series field winding and a shunt field winding, including in combination, a source of current, a manually operable control switch movable between two circuit controlling positions, a first circuit completed when said control switch is in one position for energizing said armature and said field windings, and a second circuit including an automatic switch operable by the motor for maintaining said armature and field windings energized when the manually operable switch is in the other position, said automatic switch being operable at a predetermined wiper position to deenergize said armature and field windings and short circuit said armature and shunt field winding to establish a self-generative braking circuit for said motor.

References Cited in the file of this patent

UNITED STATES PATENTS

| | | |
|---|---|---|
| 1,294,664 | Howey | Feb. 18, 1919 |
| 1,805,248 | King | May 12, 1931 |
| 2,307,204 | Ehrlich | Jan. 5, 1943 |
| 2,560,000 | Sacchini | July 10, 1951 |

FOREIGN PATENTS

| | | |
|---|---|---|
| 358,755 | Great Britain | Oct. 15, 1931 |
| 505,545 | Great Britain | May 12, 1939 |

OTHER REFERENCES

Principles of Electric Motors and Control, by Fox, 1st ed., 1942, McGraw-Hill Co. pp. 463–465.